(12) United States Patent
Wambold et al.

(10) Patent No.: US 7,047,619 B2
(45) Date of Patent: May 23, 2006

(54) SEAL INSTALLATION TOOL AND METHOD

(75) Inventors: Barry Wambold, Elkhorn, WI (US);
Kirk VanAcker, Walworth, WI (US);
Connie Mroch, Elkhorn, WI (US);
Larry Norton, Elkhorn, WI (US)

(73) Assignee: SPX Corporation, Charlotte, NC (US)

(\*) Notice: Subject to any disclaimer, the term of this patent is extended or adjusted under 35 U.S.C. 154(b) by 219 days.

(21) Appl. No.: 10/733,463

(22) Filed: Dec. 12, 2003

(65) Prior Publication Data

US 2005/0125982 A1    Jun. 16, 2005

(51) Int. Cl.
*B23P 11/02* (2006.01)

(52) U.S. Cl. ............................. 29/451; 29/235; 29/446; 29/450; 29/269; 29/229; 100/9; 277/316

(58) Field of Classification Search .................. 29/235, 29/451, 446, 450, 269, 229; 100/9; 277/316

See application file for complete search history.

(56) References Cited

U.S. PATENT DOCUMENTS

| | | | | |
|---|---|---|---|---|
| 3,981,066 | A  | * | 9/1976 | Calvert ......................... 29/451 |
| 6,408,497 | B1 | * | 6/2002 | Whetstone ................... 29/235 |
| 6,862,789 | B1 | * | 3/2005 | Hering et al. ................. 29/235 |

OTHER PUBLICATIONS

Parker O-Ring Handbook, Basic O-Ring Elastomers, pp. 2-5, 2-6, 2-7.

\* cited by examiner

*Primary Examiner*—Marc Jimenez
*Assistant Examiner*—Christopher Agrawal
(74) *Attorney, Agent, or Firm*—Baker & Hostetler LLP

(57) ABSTRACT

A tool and method is provided for the installation of radial seals such as for example O-rings into radial grooves. The tool and method can be used to install an O-ring into a dovetailed groove of an items such as a valve stem. The tool includes a first part having a first face at an angle relative to a plane in which the plane lies and a second part having a second face opposed to the first face and that a second opposite angle relative to the plane in which the seal lies. Compressing the first and the second part towards the two faces together squeezes the seal and urges it into the groove.

21 Claims, 2 Drawing Sheets

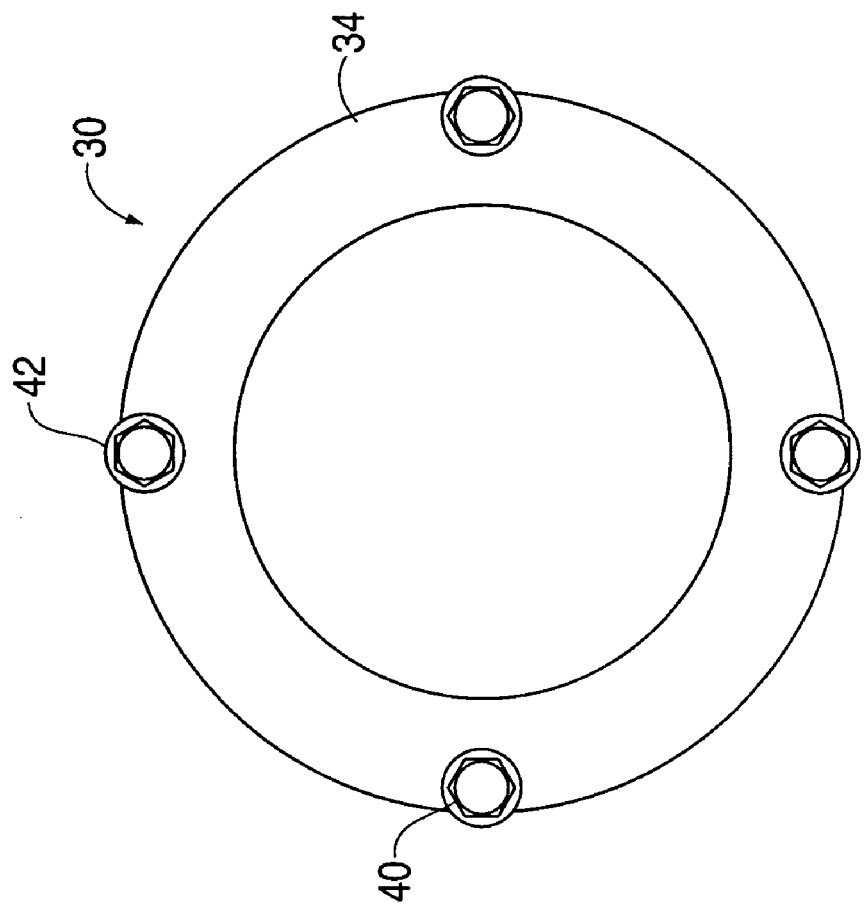
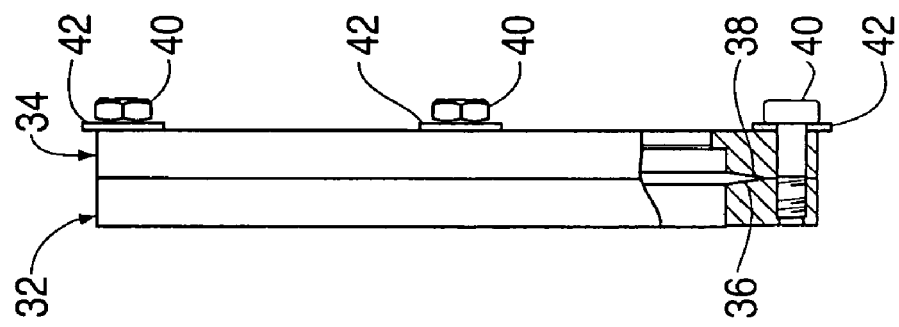

SEAL INSTALLATION TOOL AND METHOD

FIELD OF THE INVENTION

The present invention pertains to tools and methods for the installation of radial seals such as for example O-rings into radial grooves.

BACKGROUND OF THE INVENTION

Radial seals are in wide use in industry. An example of a type of radial seal is a torodial elastomeric seal often having a circular cross section, or an O-ring, which rests in a groove in one member and provides a sealing contact against another member. Such seals are used for example in the case of a valve stem which is rotatably disposed in valve body or housing. In some instances, the valve stem will have either a shallow supporting groove, or a deeper dovetailed groove which supports the O-ring in an axial location so that it is in sealing contact with an opposed facing surface on the valve body.

In the case of a relatively shallow seal supporting groove, installation of the seal is generally easily facilitated, since the seal needs only to be expanded over the valve stem and slid into position in the shallow groove, so that when it is released it contracts and snaps into place on the seal receiving groove.

However, in the case of a more deep and or a dovetailed seal receiving groove, installation can often be more complex. When the O-ring is expanded and slid over the groove, its natural contraction force is generally insufficient to pull it all the way into a dovetailed groove. Rather, since the seal has a diameter greater than the opening into the dovetailed groove, the seal tends to simply come to rest around the outside opening of the dovetailed groove. The seal then must be forced radially inwards with a sufficient inward compressive force to squeeze it into the groove.

One prior art method of forcing such a seal into such a dovetail groove has been to take a relatively blunt tool such as a crescent shaped dull blade in a file handle and manually use the tool to press on the outside of the O-ring to force it into the dovetailed retaining groove.

When the O-ring is installed using this approach, a user must generally work his way slowly around the circumference of the seal, forcing a small portion of the circumference into the groove with each pressing motion. This method of installation has the drawbacks that it is somewhat cumbersome and labor intensive, as well as being somewhat time consuming. For certain conventional seals in some valves, the process has been known to take 3 to 10 minutes per seal.

Accordingly, there is a need in the art for a radial seal installation tool and method that can conveniently and economically facilitate installation of a radial seal into a dovetailed receiving groove or channel.

SUMMARY OF THE INVENTION

The foregoing needs are met, to a great extent, by the present invention, wherein in one aspect an apparatus is provided that in some embodiments can conveniently and economically facilitate installation of a radial seal into a dovetailed receiving groove or channel.

In accordance with one aspect of the present invention, a tool for inserting a radial seal into a dovetailed groove, is provided having a first part having a first face at a first angle $\beta 1$ relative to a plane of the seal, and a second part having a second face opposed to the first face, and at a second angle $\beta 2$ relative to the plane of the seal.

In accordance with another aspect of the present invention, a tool for inserting a radial seal into a dovetailed groove is provided having a first part having a first face at a first angle relative to a plane of the seal, and a second part having a second face opposed to the first face, and at a second angle relative to the plane of the seal, wherein the first and second angle form an included angle between the faces.

In accordance with yet another aspect of the present invention, a tool for inserting a radial seal into a dovetailed groove is provided having a first part having a first face at a first angle $\beta 1$ relative to a plane of the seal, a second part having a second face opposed to the first face, and at a second angle $\beta 2$ relative to the plane of the seal, and means for urging the first and second faces towards each other.

In accordance with yet another aspect of the present invention, a method for inserting a radial seal into a dovetailed groove is provided including locating a first part having a first face at a first angle $\beta 1$ relative to a plane of the seal, locating a second part having a second face opposed to the first face and at a second angle $\beta 2$ relative to the plane of the seal, and compressing the first part and the second part together to urge the first and second faces together against the radial seal until the seal enters the groove.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a side, partially cutaway cross sectional, view of an alternative embodiment of an O-ring installation tool according to the present invention.

FIG. 7 is a end view of the alternative embodiment of the tool of FIG. 6.

DETAILED DESCRIPTION

Figure 1:
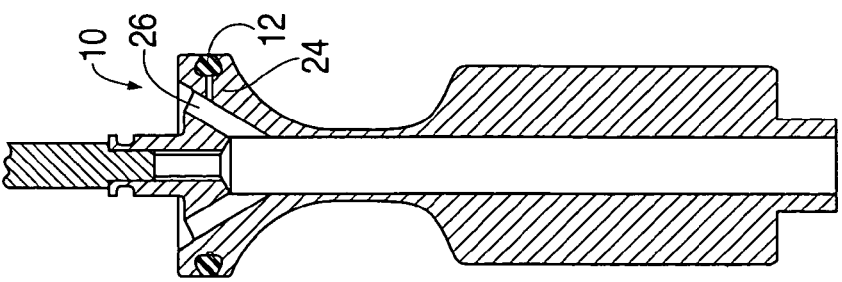
FIG. 1 is a cross sectional view of a valve stem with an O-ring placed thereon.

The invention provides a tool and method for installation of a radial seal such as an annular elastomeric seal or O-ring, into a supporting groove or bore such as for example a dovetailed supporting groove or channel. Preferred embodiments of the invention will now be described with reference to the drawing figures, in which like reference numerals refer to like parts throughout.

FIG. 1 illustrates a valve stem 10 having a O-ring 12 positioned so that it is resting just around the opening of a dovetailed O-ring supporting groove 14. The configuration of FIG. 1 is achieved by manually stretching the O-ring 12 so that it is slightly larger than the stem diameter, and sliding or rolling the O-ring 12 down until axially aligned with the groove 14 and letting it relax into the position shown in FIG. 1.

Figure 2:
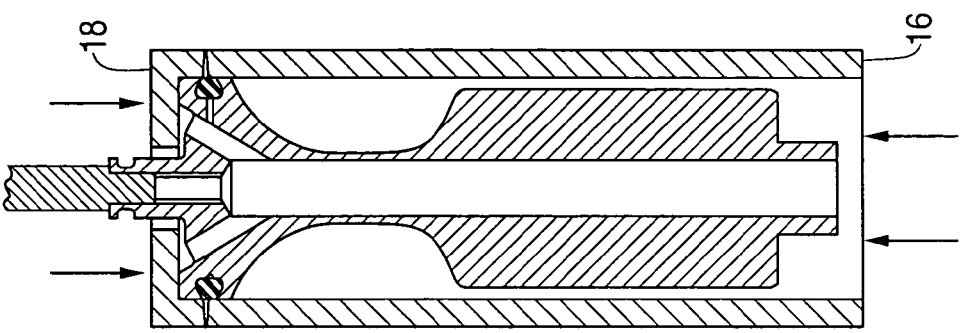
FIG. 2 is a cross section view showing an O-ring installation tool positioned around the valve stem, according to a preferred embodiment of the present invention.

FIG. 2 illustrates a preferred tool having a lower part 16 and opposed upper part 18 spaced on either side of the O-ring 12 as shown. The lower part 16 has an upwardly facing upper face 20 which is beveled inwardly and downwardly as illustrated. The upper part 18 has a downward facing lower face 22 which faces the opposed face 20 and which has an opposite but equal beveled angle. Accordingly, each face 20 and 22 has a beveled angle ($\beta$) with respect to an imaginary plane that is the plane in which the O-ring 12 and groove 14 lie. This plane is also perpendicular to the longitudinal axis of the stem 10. An included angle between the faces 20 and 22 ($2\beta$) is formed.

In the case of an O-ring of the exemplary shape illustrated being pressed into a dovetailed groove of the exemplary shape illustrated, and in the case of for example an 80 durameter elastomeric rubber O-ring, it has been found that an angle of approximately 5 degrees to 8 degrees is preferable for each beveled angle $\beta$, with an angle of 8 degrees for each beveled angle $\beta$ being most preferable.

As noted above, since the two opposed faces 20 and 22 each have a beveled angle $\beta$, there is an included angle $2\beta$ between the faces 20 and 22. Thus, it has been found that the angle $2\beta$ is most preferably between 10 degrees and 20 degrees, with an angle $2\beta$ of 16 degrees being most preferable.

Figure 3:
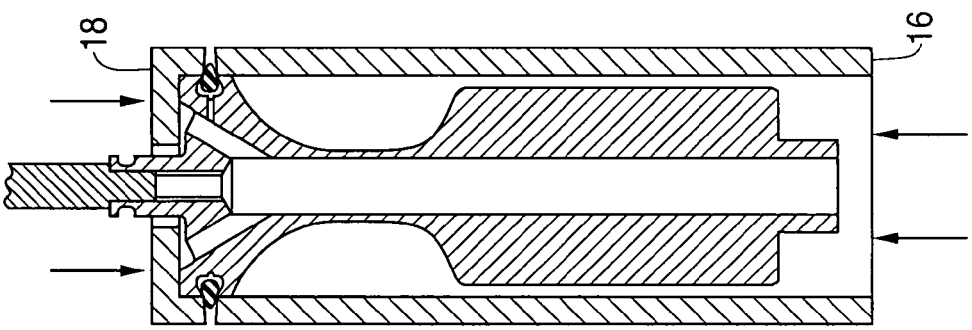
FIG. 3 is a cross sectional view showing the tool of FIG. 2 in a partially compressed position.
Figure 4:
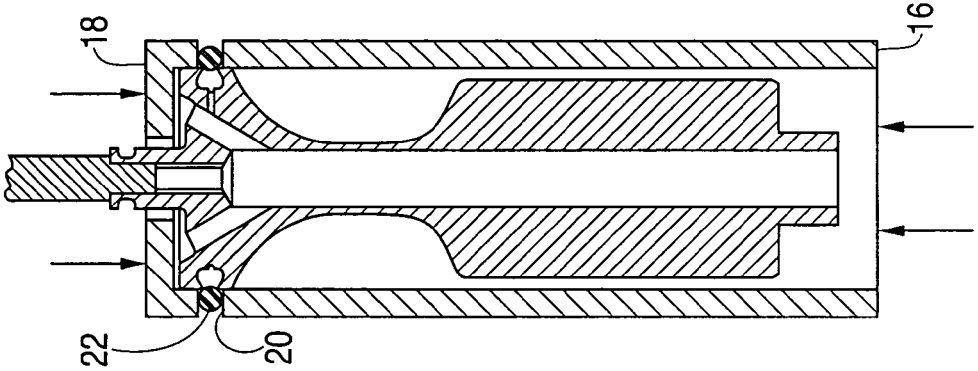
FIG. 4 is a cross sectional view of the tool of FIG. 2 showing the tool in a fully compressed position.
Figure 5:
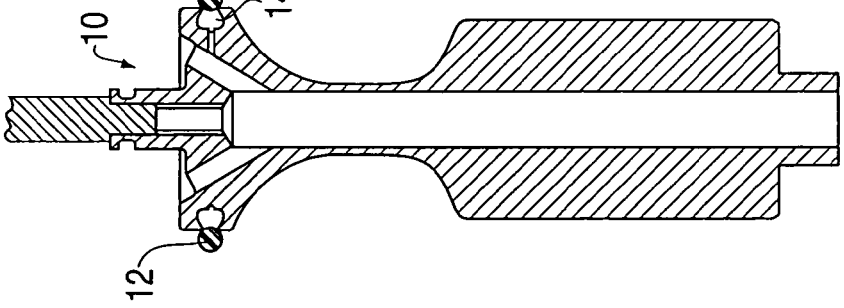
FIG. 5 is a cross sectional view of a valve stem having an O-ring installed into a dovetailed groove.

In FIG. 2 the tool has been positioned in an initial state so that the faces 20 and 22 are simply resting in contact with the O-ring 12. Next, as illustrated in FIG. 3 a force is applied in the directions indicated by the arrows to compress the tool so that lower part 16 and upper part 18 are forced together against the resistance of the longitudinal compression of the O-ring 12. Longitudinal compression of the O-ring 12 tends to squeeze the O-ring 12 so that it more readily enters the dovetailed groove 14. Moreover, the presence of the angle $\beta$ at the faces 20 and 22 tends to compress the O-ring 12 radially so that as a result of the various forces applied by the faces 20 and 22 the O-ring 12 is compressed and forced inward until the position shown in FIG. 4 is achieved, with the O-ring 12 having completely snapped into the dovetailed groove 14. The results of this operation is that the lower part 16 and upper part 18 of the tool can be removed, at which point the stem 10 has the O-ring 12 installed as shown in FIG. 5.

FIGS. 1–5 also illustrate a venting channel 24 in the stem 10 which leads to a further vent 26. The venting channel 24 is preferred because when present assists by permitting the air originally in the volume of the dovetailed groove 14 to escape when the O-ring 12 enters and fills the dovetailed groove 14.

The compressive axial force indicated by the arrows is applied by any suitable force applying arrangement. In some instances, it may be possible to generate sufficient compressive force by hand, or by using a mechanical lever arrangement of some sort. A preferred method has been found to be the use of an arbor press. The arbor press is arranged having the bottom of the press platen supporting the bottom of the tool lower part 16 and the upper pressing member pressing downwards on the top of the tool upper part 18. In one example of a seal as illustrated in FIGS. 1–5, the preferred embodiment can allow a user to accomplish the seal installation in less than one minute, compared to 3 to 10 minutes using prior art installation tools.

Of course, rather than using a separate external compressive device, an alternative embodiments the lower part 16 and the upper part 18 may have some cooperative mechanical devices, such as lever handles or threaded connections, attached directly thereto which can be activated to facilitate providing the force indicated by the arrows.

FIGS. 6 and 7 illustrate an alternative embodiment of the invention wherein a lower part 32 and an upper part 34 each have beveled faces 36 and 38, respectively opposite to each other with an included angle such as the included angle described with respect to the embodiment of FIGS. 1–5.

In the embodiment of FIGS. 6 and 7, to achieve the compressive force between the lower part 32 and the upper part 34, a number of bolts 40 and washers 42 are used which have a threaded connection into threaded receptacles on the lower part 32. Four bolts 40 equally spaced are preferred, but other numbers of two or more bolts may be used.

The embodiment of FIGS. 6 and 7 provides a particularly portable and convenient device. The tool is first disassembled so that the lower half 32 and upper half 34 can be placed on opposite axial positions around the O-ring, and then the parts 32 and 34 are urged together, or axially compressed, by tightening of the bolts 40 until sufficient tightening has been achieved to force the O-ring into the dovetailed groove in a fashion similar to that described with respect to FIGS. 1–5.

Considerations for the amount of the beveled angle of each face 36 and 38 and the resulting included angle are generally similar to those that were described with respect to FIGS. 1–5. Thus, in the illustrated embodiment, the bevel angle of each face 36 and 38 is preferably between 5 and 8 degrees, and most preferably 8 degrees with respect to the plane of the groove and seal (i.e., the plane perpendicular to the axis of the valve stem), in the included angle is preferably between 10 and 16 degrees, and most preferably 16 degrees.

The specific shape of the dovetailed groove 14 that is illustrated is exemplary only and it will be readily apparent that the tool and method described herein can be used with other seal cross sectional shapes, and other groove cross sectional shapes. The tool and method can be used in many circumstances where it is desired to force an O-ring into a groove, particularly wherein an inward radial force and/or an axial compressive force are needed to urge the O-ring into the groove.

Further, the use of the term O-ring herein is intended in its broad sense to relate to radial or torodial seals having some degree of compressiability. Common examples of such seals include molded rubber EPDM rings, and also FKM Viton® (DuPont Tradename) rings.

Also, the reference to a valve stem is for example only, and it will be readily appreciated that the tool and method of the invention can be used to install an O-ring into any sort of part having an annular groove for receipt of a radial sealing ring. Valve stems are often made of a metal such as for example stainless steel but since the tool does not need to come into any significant degree with the stem, it can be used with stems of any of the wide variety of materials, including plastic. The upper parts and lower parts themselves of the tool are preferably made of a sturdy rigid material such as stainless steel for cleanliness and durability, but of course can be made of any other suitable material. The angles β of the faces are most preferably substantially equal. However, in alternative embodiment one face can have a first angle β1 and the second face a second angle β2, which may be substantially equal to each other, or may differ from each other in magnitude to some extent.

Although preferred embodiments of the tool are illustrated for use to install an O-ring surrounding a stem having an inwardly projecting supporting groove, it will be appreciated that the invention can also be applied to install an O-ring outward into an inwardly facing radial supporting groove of an inside bore of a body if desired.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool system for inserting a radial seal into a dovetailed groove on a cylindrical stem, the system comprising:
a tool comprising:
   a first part having a first face at a first angle β1 relative to a plane of the seal;
   a second part having a second face opposed to the first face, and at a second angle β2 relative to the plane of the; and
   a vent, disposed in the stem, extending radially inward from the groove to a central bore in the stem.

2. A tool according to claim 1, when the angles β1 and β2 are of substantially equal magnitude.

3. A tool according to claim 1, wherein the angles β1 and β2 are each between approximately 5 degrees and approximately 8 degrees.

4. A tool according claim 1, wherein the angles β1 and β2 are each approximately 8 degrees.

5. A tool according to claim 1, further comprising at least two threaded receptacles in the first part, and corresponding bores in the second part; and
at least two bolts each corresponding to one threaded receptacle and bore which when tightened compress the first and second parts together.

6. A tool according to claim 1, wherein the first and second faces each lie in a respective conical plane.

7. A tool system for inserting a radial seal into a dovetailed groove on a cylindrical stem, the system comprising:
a tool comprising:
   a first part having a first face at a first angle relative to a plane of the seal;
   a second part having a second face opposed to the first face, and at a second angle relative to the plane of the seal, wherein the first and second angle form an included angle between the faces; and
   a vent, disposed in the stem, extending radially inward from the groove to a central bore in the stem.

8. A tool according to claim 7, wherein the included angle is between approximately 10 degrees and approximately 16 degrees.

9. A tool according to claim 7, wherein the included angle is approximately 16 degrees.

10. A tool according to claim 7, further comprising at least two threaded receptacles in the first part, and corresponding bores in the second part; and
at least two bolts each corresponding to one threaded receptacle and bore, which when tightened compress the first and second parts together.

11. A tool according to claim 7, wherein the first and second faces each lie in a respective conical plane.

12. A tool system for inserting a radial seal into a dovetailed groove on a cylindrical stem, the system comprising:
a tool comprising:
   a first part having a first face at a first angle β1 relative to a plane of the seal;
   a second part having a second face opposed to the first face, and at a second angle β2 relative to the plane of the seal;
   means for urging the first and second faces towards each other; and
   a vent, disposed in the stem, extending radially inward from the groove to a central bore in the stem.

13. A tool according to claim 12, wherein the angles β1 and β2 are of substantially equal magnitude to each other.

14. A tool according to claim 12, wherein the angles β1 and β2 are each between approximately 5 degrees and approximately 8 degrees.

15. A tool according to claim 12, wherein the angles β1 and β2 are each approximately 8 degrees.

16. A tool according to claim 12, wherein the urging means at least two threaded receptacles in the first part, and corresponding bores in the second; and at least two bolts each corresponding to one threaded receptacle which when tightened compressed the first and second parts together.

17. A method for inserting a radial seal into a dovetailed groove on a cylindrical stem, the method comprising:
locating a first part having a first face at a first angle β1 relative to a plane of the seal;
locating a second part having a second face opposed to the first face and at a second angle β2 relative to the plane of the seal; and
compressing the first part and the second part together to urge the first and second faces together against the radial seal until the seals enters the groove, wherein the stem has a vent, disposed in the stem, extending radially inward from the groove to a central bore in the stem, and the compressing step vents air from the groove via the vent.

18. A method according to claim 17, wherein the angles β1 and β2 are selected to be of substantially equal magnitude as each other.

19. A method according to claim 17, wherein the angles β1 and β2 are each between approximately 5 degrees and approximately 8 degrees.

20. A method according to claim 17, wherein the angles β1 and β2 are each approximately 8 degrees.

21. A method according to claim 17, wherein the compressing step comprises the step of tightening threaded bolts which are threaded through one of the parts and into the other of the parts.

* * * * *

UNITED STATES PATENT AND TRADEMARK OFFICE
CERTIFICATE OF CORRECTION

| | |
|---|---|
| PATENT NO. | : 7,047,619 B2 |
| APPLICATION NO. | : 10/733463 |
| DATED | : May 23, 2006 |
| INVENTOR(S) | : Barry Wambold et al. |

It is certified that error appears in the above-identified patent and that said Letters Patent is hereby corrected as shown below:

<u>Column 5</u>

Line 37, replace "the;" with --the seal;--

Signed and Sealed this

Fifteenth Day of August, 2006

JON W. DUDAS
*Director of the United States Patent and Trademark Office*